(12) United States Patent
Wang

(10) Patent No.: US 9,532,019 B2
(45) Date of Patent: Dec. 27, 2016

(54) COLOR GRADING MONITOR, COLOR GRADING SYSTEM AND COLOR GRADING METHOD THEREOF

(71) Applicant: SZ ZUNZHENG DIGITAL VIDEO CO., LTD, Shenzhen (CN)

(72) Inventor: Zunzheng Wang, Shenzhen (CN)

(73) Assignee: SZ ZUNZHENG DIGITAL VIDEO CO., LTD, Shenzhen (CN)

( * ) Notice: Subject to any disclaimer, the term of this patent is extended or adjusted under 35 U.S.C. 154(b) by 0 days.

(21) Appl. No.: 14/759,234

(22) PCT Filed: Jun. 20, 2014

(86) PCT No.: PCT/CN2014/080427
§ 371 (c)(1),
(2) Date: Jul. 6, 2015

(87) PCT Pub. No.: WO2015/192380
PCT Pub. Date: Dec. 23, 2015

(65) Prior Publication Data
US 2016/0269700 A1    Sep. 15, 2016

(51) Int. Cl.
| H04N 9/31 | (2006.01) |
| H04N 1/60 | (2006.01) |
| H04N 9/64 | (2006.01) |
| G11B 27/031 | (2006.01) |
| H04N 9/67 | (2006.01) |

(52) U.S. Cl.
CPC ........... *H04N 9/3182* (2013.01); *G11B 27/031* (2013.01); *H04N 1/60* (2013.01); *H04N 9/64* (2013.01); *H04N 9/67* (2013.01)

(58) Field of Classification Search
USPC .................. 348/650, 651, 708, 655–657
See application file for complete search history.

(56) References Cited

U.S. PATENT DOCUMENTS 6,417,891 B1 * 7/2002 Cacciatore ............ G06T 11/001
348/631
7,009,734 B2 * 3/2006 Suwa ................... H04N 1/6025
345/601

(Continued)

FOREIGN PATENT DOCUMENTS

| CN | 1875616 Y | 12/2006 |
| CN | 1922630 Y | 2/2007 |

(Continued)

*Primary Examiner* — Paulos M Natnael

(57) ABSTRACT

The present invention discloses a toning monitor with LUT mapping function, for performing LUT mapping to an input image. The toning monitor comprises an LUT storing unit and further comprises a receiving module, an analysis module, and a display module. The receiving module is configured for receiving at least one LUT data. The analysis module is configured for analyzing that whether the LUT data meets a predetermined condition. If the LUT data meets the predetermined condition, the received data is updated in the LUT storing unit for a new LUT mapping. If the LUT data does not meet the predetermined condition, the LUT data is discarded. The display module is configured for displaying the input image which is updated with the new LUT mapping according to the analysis result from the analysis module.

8 Claims, 3 Drawing Sheets

(56) References Cited

U.S. PATENT DOCUMENTS

| | | | |
|---|---|---|---|
| 7,042,464 B1* | 5/2006 | Paquette | G06T 11/001 345/589 |
| 7,843,465 B1 | 11/2010 | Shaick | |
| 8,098,260 B1* | 1/2012 | Shaick | G09G 5/02 345/427 |
| 2002/0008709 A1* | 1/2002 | Suzuki | H04N 1/6025 345/600 |
| 2004/0021882 A1* | 2/2004 | Kakutani | H04N 1/6019 358/1.9 |
| 2005/0270600 A1* | 12/2005 | Ito | H04N 1/603 358/518 |
| 2006/0274386 A1* | 12/2006 | Wakazono | H04N 9/735 358/518 |
| 2007/0127074 A1* | 6/2007 | Hayaishi | H04N 1/4074 358/3.01 |
| 2007/0153020 A1* | 7/2007 | Inoue | H04N 1/6019 345/591 |
| 2007/0195342 A1* | 8/2007 | Sugiura | H04N 1/46 358/1.9 |
| 2007/0271307 A1* | 11/2007 | Bergsten | G06F 3/0613 |
| 2010/0156774 A1* | 6/2010 | Broughton | G09G 3/2018 345/88 |
| 2010/0228911 A1* | 9/2010 | Sasao | G11C 15/00 711/108 |
| 2011/0149777 A1* | 6/2011 | Robbins | H04L 49/201 370/252 |
| 2012/0169719 A1* | 7/2012 | Kim | H04N 13/0422 345/419 |
| 2013/0108183 A1* | 5/2013 | Bruls | G06T 9/004 382/233 |
| 2015/0358646 A1* | 12/2015 | Mertens | H04N 1/6058 382/166 |

FOREIGN PATENT DOCUMENTS

| | | |
|---|---|---|
| CN | 101093439 | 12/2007 |
| CN | 101388794 Y | 3/2009 |
| CN | 101796809 A | 8/2010 |

\* cited by examiner

COLOR GRADING MONITOR, COLOR GRADING SYSTEM AND COLOR GRADING METHOD THEREOF

TECHNICAL FIELD

The present invention relates to the field of image/video processing technology, and in particular, to a color grading monitor, color grading system and color grading method thereof.

BACKGROUND

Color grading is the process of altering and enhancing the color of a motion picture, video image, or still image either electronically, photo-chemically or digitally. Modern color correction, whether for theatrical film, video distribution, or print is generally done digitally in a color suite.

Regarding today's digital cinema technology, any image of the cinema will experience a plurality of different systems from image acquisition to the final projection. For example, at first, the images captured by a digital camera are needed to be graded with a color grading system, and then, the graded images are recorded into films through a film recorder. Finally, the images are projected to screen via a projection system. However, since each projection system has its own unique color space, same images would be shown out in difference via different projection systems. Therefore, a task of color management in such projection systems is to recognize the characteristics of the color space thereof, so as to unify the color space in different systems. In simple terms, the task of the color management is to ensure the image during production is substantially consistent with the images shown on the terminal screen.

In general, the process of the color management can be recognized as a color conversion process in different color space. Without color correction, a same image will be seen in large difference for different color spaces, i.e. the images shown on the monitor is very different from the images shown on the final screen. Besides, significant visual difference will appear between different monitors and different projection environment. In absolute terms, there is no two color space systems are exactly the same in the world. At present, the role of the color management systems appeared in the market is to minimize the visual difference of images between different media and display devices. The most important element for this role is unifying the images shown on the monitor during digital color grading process with the images shown on the final screen copied from the film, to make them "look" more similarly. It is the only way to provide a relatively "accurate" visual reference for color grading staffs. In theory, such kind of color space conversion is often completed by LUT (Look Up Table).

The LUT is a bridge to connect different color spaces in the process of color management. The LUT can feed back an output value in accordance with an input value. For example, in a color space 1 with 10 bit RGB, a red color is expressed as R=640, G=102, B=94, and this red color also exists in another color space 2 with 10 bit RGB, but is expressed as R=600, G=90, B=145. Then, the LUT which converts the color space 1 to the color space LUT 2 will feed back the value of R=600, G=90, B=145 after reading the data of R=640, G=102, B=94.

One feature of the LUT is that, it can perform the color correction for different display devices without changing the original file. The benefit by this way is the original images are not processed and accordingly will not be damaged. And furthermore, a lot of rendering time will be saved since without changing the original images.

However, the existing LUT color grading process is very complicated. In order to achieve color grading functionality, an additional color grading cartridge is often required to do the color grading processing with the LUT data which is generated from an application software. That is to say, in the prior technology, the monitor includes an LUT module, and the color grading cartridge also includes an LUT module, wherein the LUT module of the monitor is used to implement the mapping of color space, and the LUT module of the color grading cartridge is used to do the color grading processing. As such, the integration of the system is low.

SUMMARY

The present invention is directed to providing a color grading monitor, a color grading system and a color grading method being able to integrate the LUT modules therein, for simplifying the color grading system, to solve the above problems.

In one embodiment, a color grading monitor is provided. The color grading monitor has LUT mapping function, for performing LUT mapping to an input image. The color grading monitor comprises an LUT storing unit, and further comprises: a receiving module, configured for receiving at least one LUT data; an analysis module, configured for analyzing that whether the LUT data meets a predetermined condition, if the LUT data meets the predetermined condition, the received data is updated in the LUT storing unit for a new LUT mapping; if the LUT data does not meet the predetermined condition, the LUT data is discarded; and a display module, configured for displaying the input image which is updated with the new LUT mapping according to the analysis result from the analysis module.

In another embodiment, a color grading monitor is provided. The color grading monitor has LUT mapping function for performing LUT mapping to an input image. The color grading monitor comprises an LUT storing unit, and further comprises: an LUT data generation module, configured for generating LUT data in a specific format based on a user operation; an update module, connected to the LUT storing unit, configured for updating the generated LUT data to the LUT storing unit for a new LUT mapping; and a display module, configured for displaying the input image with the new LUT mapping.

In another embodiment, a color grading system is provided. The color grading system comprises a color grading monitor with LUT mapping function of performing LUT mapping to an input image. Wherein the color grading system further comprises: an LUT data generation module, configured for generating LUT data in a specific format based on a user operation; a transmission module, configured for transmitting the LUT data to the color grading monitor; a first receiving module, configured for receiving the LUT data; an analysis module, configured for analyzing that whether the LUT data meets a predetermined condition, if the LUT data meets the predetermined condition, the received data is updated in the LUT storing unit for a new LUT mapping; if the LUT data does not meet the predetermined condition, the LUT data is discarded; and a display module, configured for displaying the input image with the new LUT mapping according to the analysis result from the analysis module.

In one another embodiment, a color grading method is provided. The color grading method comprises: providing a color grading monitor, which is capable of performing LUT mapping to an input image; generating LUT data in specific format according to a user operation; updating the LUT data to an LUT storing unit in the color grading monitor for a new LUT mapping; and displaying the input image with the new LUT mapping.

In operation of the color grading system and method in the above color grading monitor, the LUT data can be transferred to the color grading monitor after generated by the software. The LUT data can be updated to the LUT storing unit in real time through the color grading monitor. In addition, the color grading monitor can send a corresponding response message to the control terminal, and the user can adjust the LUT data in real time according to the feedback response information and the change of a vision on the color grading monitor, which is caused by a real-time change to the video with an effect of the new LUT data. As such, an additional color grading cartridge can be reduced.

BRIEF DESCRIPTION OF THE DRAWINGS

In order to illustrate more clearly with prior arts or embodiment of the present invention, the figures needed to be used in the embodiments of the present invention or prior arts will be described briefly in the following section. It is noted that the figures described below only relate to some embodiments of the present invention. For ordinary person skilled in the art, some other drawings according to these drawings can be easily got without paying creative work.

DETAILED DESCRIPTION

To make the objectives, technical solutions, and advantages of the present invention clearer, the present invention is further described in detail in combination with specific embodiments and attached drawings. It should be understood that the embodiments described here are only exemplary ones for illustrating the present invention, and are not intended to limit the present invention.

First Embodiment

Figure 1:
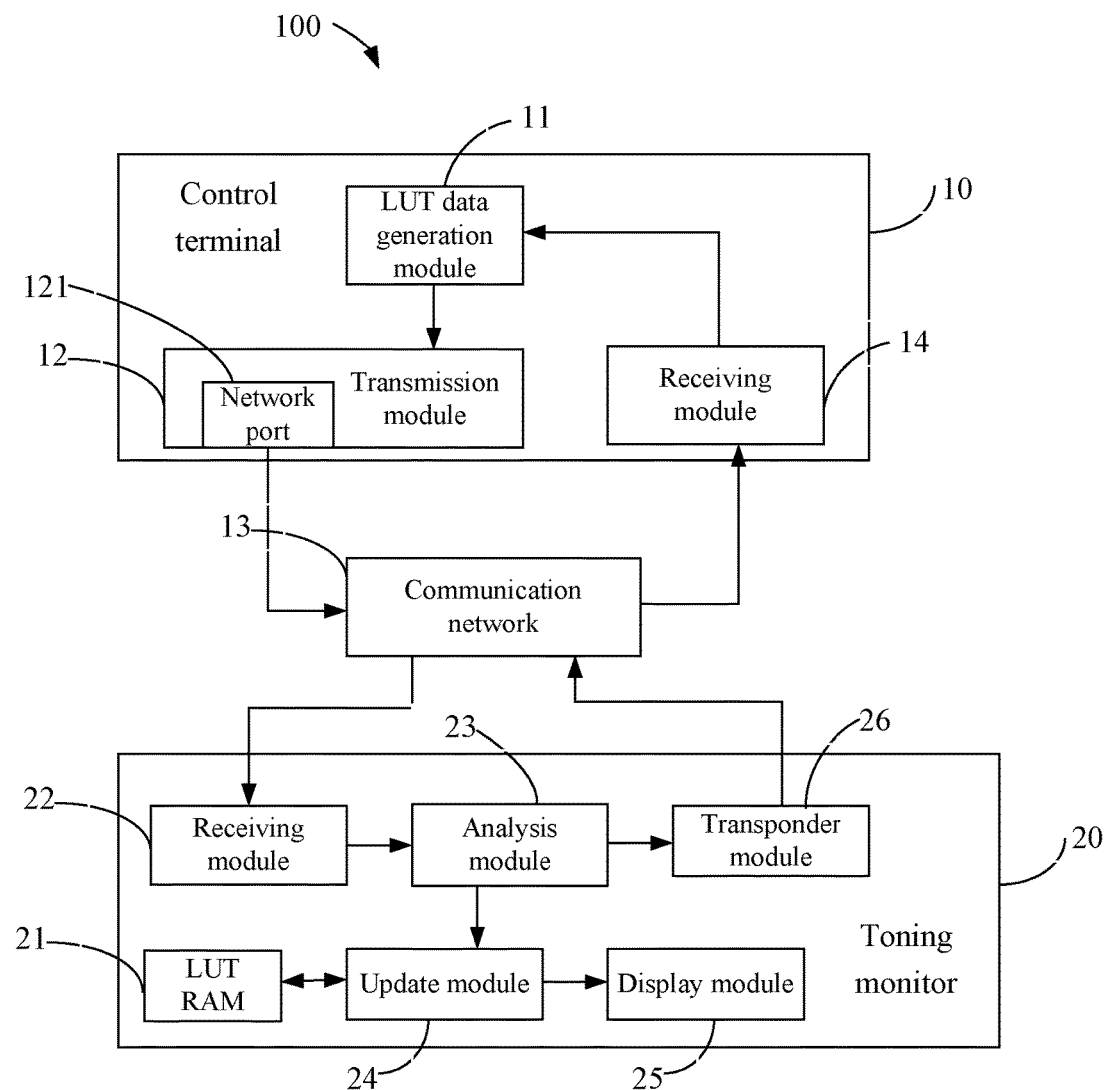
FIG. 1 is a functional block schematic view of a color grading system according to a first embodiment of the present invention.

Referring FIG. 1, a functional block schematic view of a color grading system 100 according to a first embodiment of the present invention is shown. The color grading system 100 includes a control terminal 10 and a color grading monitor 20 connected to the control terminal 10. In present embodiment, the control terminal 10 is a desktop computer. In other embodiments, the control terminal 10 may be tablet PC, laptops, mobile phones, consoles with keys (described in detail in the second embodiment), and so on.

The control terminal 10 includes an LUT data generation module 11 and a transmission module 12.

The LUT data generation module 11 is configured to generate LUT data in a specific format according to a user operation. In this embodiment, the LUT data generation module 11 may run specific color grading software. As such, the user can manually adjust some parameters of the color grading software regarding the needs, so that the color grading software is capable of performing certain software algorithm (such as ACDL) to calculate the LUT data.

The transmission module 12 is configured to transmit the LUT data to the color grading monitor 20. In this embodiment, the transmission module 12 includes a network port 121, the LUT data is transmitted to the color grading monitor 20 via a communication network 13 coupled to the network port 121. It is understood that the network port 121 can support a plurality of communication protocols such as Broadband, WiFi, 3G/4G, Ethernet, Bluetooth, Lightning network, etc. In this embodiment, broadband communication network is used for data transmission and reception.

The color grading monitor 20 has an LUT mapping function for color space, for LUT mapping to input images in real time. The color grading monitor 20 further includes an LUT storing unit 21, a first receiving module 22, an analysis module 23, an update module 24, a display module 25 and a transponder module 26.

In some embodiments, the LUT storing unit 21 may be LUT RAM. Specifically, the LUT RAM may be SRAM, DRAM, flash memory, etc. On the other way, the LUT RAM can also be replaced with LUT ROM. Further, in some other embodiments, the LUT storing unit 21 also may be cloud storage. Whatever, it is decided according to actual needs.

The first receiving module 22 is configured to receive the LUT data transmitted from the control terminal 10. In this embodiment, the first receiving module 22 is also provided with a network port (not shown), to couple to the transmission module 12 of the control terminal 12.

The analysis module 23 is configured to analyze that whether the LUT data meets a predetermined condition. If the LUT data meets the predetermined condition, the received LUT data will be updated to the LUT storing unit 21. Otherwise, the LUT data will be discarded. Specifically, the analysis module 23 may analyze the LUT data by using general data analysis methods, for example, by comparing certain parameters extracted from the LUT data to the predetermined values, to output an analysis result. In this embodiment, the analysis module 23 compares the data format, data length, and/or data parity information of the received LUT data to corresponding predetermined condition, and if the data format, data length, and/or data parity information of the received LUT data match the corresponding predetermined condition, the analysis result is "matching predetermined condition", if not match, the analysis result is "not matching predetermined condition".

The update module 24 is connected between the analysis module 23 and the LUT storing unit 21. When the analysis result is "matching predetermined condition", the analysis module 23 will transmit the LUT data to the update module 24 to update the LUT data to the LUT storing unit 21, then enable the LUT mapping function for a new LUT mapping. In some embodiments, the update module 24 updates the storing timing of the LUT data in the LUT storing unit 21, with reading the storing timing of an old data in the LUT storing unit 21 and the storing timing of a newly acquired LUT data. Furthermore, the update module 24 may also emphasize the timing of the updated LUT data, and then remove the mark when the next updating process coming. After the update is completed, users can observe the changes of the video shown on the screen of the color grading monitor 20, in real-time.

The display module 25 is configured to display the input image which is updated with LUT mapping, according to the analysis results of the analysis module 23. Specifically, the display module 25 is connected to the update module 24. When the analysis result is "matching predetermined condition", the update module 24 outputs a control signal to the display module 25, so that the display module 25 can receive and display the input image which is updated.

The transponder module 26 is configured to feedback the analysis results of the analysis module 23 to the control terminal 10. In this embodiment, the transponder module 26 feeds back a message of "received data is correct" or "received data error". Specifically, when the analysis result is "matching predetermined condition", the transponder module 26 feeds back the message of "received data is correct", when the analysis result is "not matching predetermined condition", the transponder module 26 feeds back the message of "reception data error".

In this embodiment, the control terminal 10 further includes a second receiving module 14 for receiving and displaying the feedback message from the transponder module 26, so that the user can determine if it is needed to re-update (or adjust) the LUT data according to the response message. For example, if the response message is "received data is correct", the user can determine if it is needed to update the LUT data again according to changes of the adjusted video shown on the screen of the color grading monitor 20. If the response message is "receive data error", the user needs to check if there are problems happened to the connection between the control terminals 10 and the color grading monitor 20.

When in operation of the above-described color grading system 100, the LUT data is transmitted to the color grading monitor 20 after being generated by software. Through the analysis module 23 and the update module 24, the LUT data can be updated in real time to the LUT storing unit 21 which is inside the color grading monitor 20. In addition, the color grading monitor 20 may transmit the corresponding response (feedback) message to the control terminal 10, so that the user can confirm to adjust the LUT data in real time based on observation of the change of the video shown on the color grading monitor 20. As such, a color grading operation can be realized without additional color grading cartridge.

Second Embodiment

Figure 2:
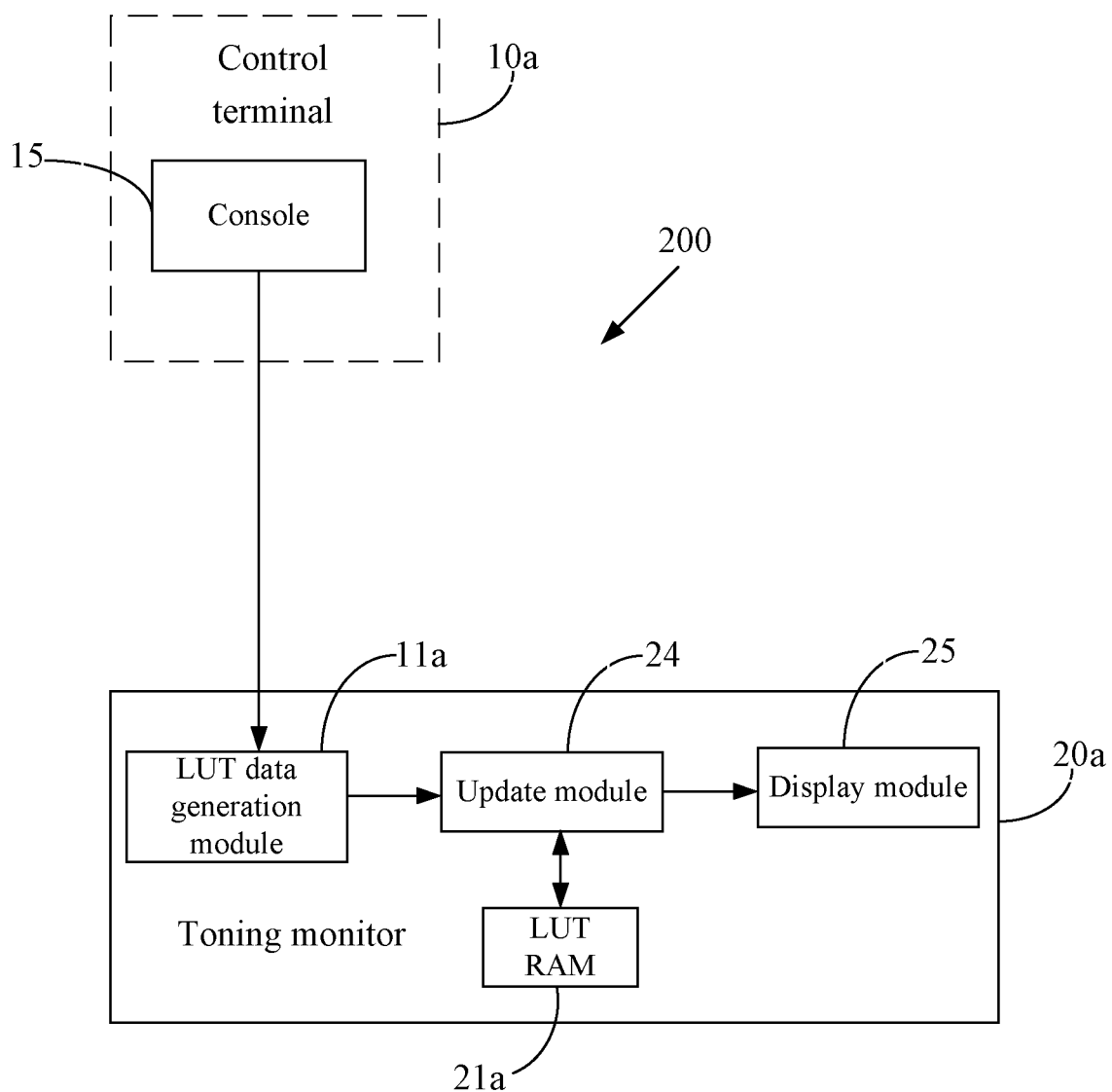
FIG. 2 is a functional block schematic view of a color grading system according to a second embodiment of the present invention.

Referring FIG. 2, the color grading system 200 of a second embodiment of the present invention is similar to the color grading system 100 of the first embodiment, the difference is that the control terminal 10a of the second embodiment includes a console 15 having an operation portion (e.g. keyboard), and LUT data generation module 11a is integrated in the color grading monitor 20a. Note that the console 15 may be a dedicated color grading station, a keyboard or a mouse. In this embodiment, the console 15 is connected to the color grading monitor 20a through a data transmission cable, the data transmission cable may be a USB cable, a PS2 data line, or a 1394 data line, and so on.

Specifically, the color grading monitor 20a includes the LUT data generation module 11a, the update module 24 and the display module 25.

The LUT data generation module 11a is configured to generate the LUT data in a specific format based on the user's operation. In this embodiment, the console 15 outputs keyboard information in accordance with user's needs of color grading. The LUT data generation module 11a reads the keyboard information from the console 15 in real time, and generates the LUT data according to a specific algorithm.

The update module 24 is connected to the LUT storing unit 21a, to update the received LUT data in the LUT storing unit 21a, and perform a new LUT mapping therefor.

The display module 25 is configured to display the input image with the new LUT mapping. The working principle of the update module 24 and the display module 25 is omitted here since it is similar to the first embodiment thereof.

The color grading monitor 20a of the second embodiment can receive the LUT data without connecting to the network, with more convenience.

Further, the color grading monitor 20a of the second embodiment can be provided with an indicator module (not shown), to generate messages of "update completed" and "update failed" and other message, for users to determine when to adjust the LUT data.

Figure 3:
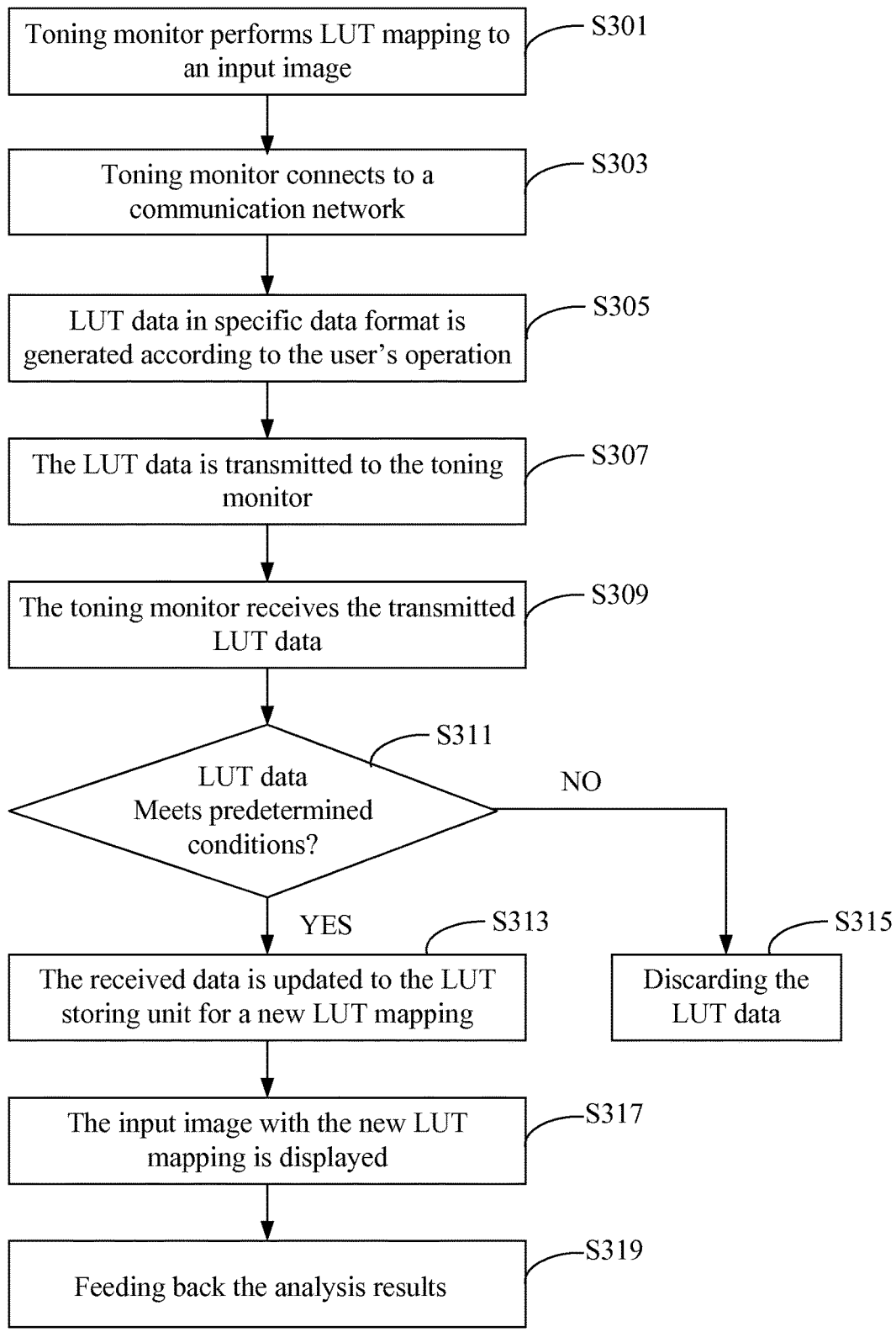
FIG. 3 is a flow chart of a color grading method according to an embodiment of the present invention.

Refer to FIG. 3, a color grading method is provided according to an embodiment of the present invention. The color grading method includes the following steps.

In step S301, a color grading monitor which is capable of LUT mapping for the input image, is provided.

In step S303, the color grading monitor is connected to a communication network.

In step S305, the LUT data in specific data format is generated according to user's operation, in a control terminal.

In step S307, the LUT data is transmitted to the color grading monitor via the communication network.

In step S309, the color grading monitor receives the transmitted LUT data.

In step S311, the LUT data is analyzed to determine whether the LUT data meets a predetermined condition. If the LUT data meets the predetermined condition, the received LUT data is updated to the LUT storing unit and a new LUT mapping is performed in step S313. If the LUT data does not meet the predetermined condition, the LUT data is discarded in step S315.

In step S317, the input image with the new LUT mapping is displayed.

In step S319, the analysis results are fed back to the control terminal.

Note that the step S301 may be performed after step S303, and the present invention is not intended to limit the order of above individual steps.

In another embodiment, steps S303, S307, S309, S311, S315 and S319 may be omitted, and this embodiment can be performed by the color grading monitor according to the above-described second embodiment.

In operation of the color grading system and method in the above color grading monitor, the LUT data can be transferred to the color grading monitor after generated by the software. The LUT data can be updated to the LUT storing unit in real time through the color grading monitor. In addition, the color grading monitor can send a corresponding response message to the control terminal, and the user can adjust the LUT data in real time according to the feedback response information and the change of a vision on the color grading monitor, which is caused by a real-time change to the video with an effect of the new LUT data. As such, an additional color grading cartridge can be reduced.

Note that by describing the above embodiments, those skilled in the art can clearly understand that the present invention may be implemented by software plus a necessary hardware platform, and definitely may also be implemented by all the hardware. Based on this understanding, technical solutions of the present invention is to contribute to the background art, all or part may be embodied in the form of a software product, which computer software product may be stored in a storage medium, such as ROM/RAM, magnetic disk, optical disk, etc., includes several instructions to instruct a computer device (may be a personal computer, a server, or network equipment) to perform the various embodiments of the invention, or certain parts of the method according to the embodiment.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A color grading monitor with LUT (Look-up table) mapping function, for performing LUT mapping to an input image, characterized in that the color grading monitor comprises an LUT storing unit, and further comprises:
   a receiving module, configured for receiving at least one LUT data or generating LUT data in a specific format according to received operation;
   an analysis module, configured for analyzing that whether the LUT data meets a predetermined condition, if the LUT data meets the predetermined condition, the received data is updated in the LUT storing unit for a new LUT mapping; if the LUT data does not meet the predetermined condition, the LUT data is discarded, wherein the analysis module compares at least of the data format, data length, and/or data parity information of the received LUT data to corresponding predetermined conditions, and if the data format, data length, and/or data parity information of the received LUT data match the corresponding predetermined conditions, the analysis result is "match predetermined condition";
   a transponder module, configured for feeding back analysis results of the analysis module to a control terminal, to determine if it is needed to re-adjust the LUT data wherein, if the analysis result is "match predetermined condition", the transponder module feeds back a message of "received data is correct", if at least one of the data format, data length, and data parity information does not match the predetermined conditions, the analysis result is "not match predetermined condition", and the transponder module feeds back a message of "reception data error"; and
   a display module, configured for displaying the input image which is updated with the new LUT mapping according to the analysis result from the analysis module.

2. The color grading monitor as claimed in claim 1, wherein the color grading monitor receives the LUT data via network port or data transmission cable connector.

3. The color grading monitor as claimed in claim 1, further comprising an update module connected between the analysis module and the LUT storing unit, and configured for updating the received LUT data to the LUT storing unit.

4. A color grading system, comprising a color grading monitor with LUT(Look-up table) mapping function of performing LUT mapping to an input image, wherein the color grading system further comprises:
   an LUT data generation module, configured for generating LUT data in a specific format based on an operation;
   a transmission module, configured for transmitting the LUT data to the color grading monitor;
   a first receiving module, configured for receiving the LUT data;
   an analysis module, configured for analyzing that whether the LUT data meets a predetermined condition, if the LUT data meets the predetermined condition, the received data is updated in the LUT storing unit for a new LUT mapping; if the LUT data does not meet the predetermined condition, the LUT data is discarded, wherein, the analysis module compares at least of the data format, data length, and/or data parity information of the received LUT data to corresponding predetermined conditions, and if the data format, data length, and/or data parity information of the received LUT data match the corresponding predetermined conditions, the analysis result is "match predetermined condition";
   a transponder module, configured for feeding back the analysis result of the analysis module to a control terminal, to determine if it is needed to re-adjust the LUT data, wherein, if the analysis result is "match predetermined condition", the transponder module feeds back a message of "received data is correct", if at least one of the data format, data length, and data parity information does not match the predetermined conditions, the analysis result is "not match predetermined condition", and the transponder module feeds back a message of "reception data error"; and
   a display module, configured for displaying the input image with the new LUT mapping according to the analysis result from the analysis module.

5. The color grading system as claimed in claim 4, wherein the control terminal further comprises a second receiving module, configured for receiving and displaying the respondent message feedback from the transponder module.

6. The color grading system as claimed in claim 4, further comprising an update module connected between the analysis module and the LUT storing unit, and configured for update the received LUT data to the LUT storing unit.

7. A color grading method, for performing LUT(Look-up table) mapping to an input image, comprising:
   receiving at least one LUT data or generating LUT data in a specific format according to received operation;
   analyzing that whether the LUT data meets a predetermined condition, if the LUT data meets the predetermined condition, the received data is updated for a new LUT mapping; if the LUT data does not meet the predetermined condition, the LUT data is discarded, wherein at least of the data format, data length, and/or data parity information of the received LUT data is compared to corresponding predetermined conditions, and if at least one the data format, data length, and/or data parity information of the received LUT data match the corresponding predetermined conditions, an analysis result of "match predetermined condition" is output;
   feeding back the analysis results to a control terminal, to determine if it is needed to re-adjust the LUT data; wherein, if the analysis result is "match predetermined condition", a message of "received data is correct " is fed back, if at least one of the data format, data length, and data parity information does not match the predetermined conditions, the analysis result is "not match predetermined condition", and a message of "reception data error" is fed back; and
   displaying the input image which is updated with the new LUT mapping according to the analysis result.

8. A color grading method, for performing LUT(Look-up table) mapping to an input image, comprising:
   generating LUT data in a specific format based on an operation;
   transmitting the LUT data to a color grading monitor;
   receiving the LUT data;
   analyzing that whether the LUT data meets a predetermined condition, if the LUT data meets the predetermined condition, the received data is updated for a new LUT mapping; if the LUT data does not meet the predetermined condition, the LUT data is discarded, wherein, at least of the data format, data length, and/or data parity information of the received LUT data is compared to corresponding predetermined conditions, and if at least one of the data format, data length, and/or data parity information of the received LUT data match the corresponding predetermined conditions, the analysis result is "match predetermined condition";

feeding back the analysis results to a control terminal, to determine if it is needed to re-adjust the LUT data; wherein, if the analysis result is "match predetermined condition", a message of "received data is correct" is fed back, if at least one of the data format, data length, and data parity information does not match the predetermined conditions, the analysis result is "not match predetermined condition", and a message of "reception data error" is fed back; and displaying the input image with the new LUT mapping according to the analysis result.

* * * * *